United States Patent
Jasti et al.

(10) Patent No.: US 12,039,381 B2
(45) Date of Patent: Jul. 16, 2024

(54) ON-DEMAND CODE EXECUTION DATA MANAGEMENT

(71) Applicant: Amazon Technologies, Inc., Seattle, WA (US)

(72) Inventors: Srinivas Jasti, Sammamish, WA (US); Prashant Kumar Singh, Seattle, WA (US); Christopher Magee Greenwood, Seattle, WA (US); Sushant Bhatia, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 17/935,900

(22) Filed: Sep. 27, 2022

(65) Prior Publication Data
US 2024/0103942 A1    Mar. 28, 2024

(51) Int. Cl.
*G06F 9/54* (2006.01)
*G06F 9/455* (2018.01)

(52) U.S. Cl.
CPC .......... *G06F 9/544* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 5,226,160 A | * | 7/1993 | Waldron | G06F 9/44505 719/324 |
| 2007/0169033 A1 | * | 7/2007 | Metzgen | G06F 30/30 717/140 |
| 2019/0303209 A1 | * | 10/2019 | Pope | G06F 9/45558 |

OTHER PUBLICATIONS

International Search Report and Written Opinion received in PCT Application No. PCT/US2023/033536, dated Nov. 22, 2023 in 17 pages.
Yu et al., "Following the Data, Not the Function: Rethinking Function Orchestration in Serverless Computing", Cornell University Library, Jul. 10, 2022 in 18 pages.
Cao et al., "A Logical Approach to Cloud Federation", Cornell University Library, Aug. 10, 2017, in 14 pages.

\* cited by examiner

*Primary Examiner* — Craig C Dorais
(74) *Attorney, Agent, or Firm* — Knobbe, Martens, Olson & Bear, LLP (57) ABSTRACT

Systems and methods are provided for managing provision of—and access to—data sets among instances of function code executing in an on-demand manner. An API is provided by which functions can store data sets to be shared with other functions, and by which functions can access data sets shared by other functions.

20 Claims, 5 Drawing Sheets

Fig. 5

ON-DEMAND CODE EXECUTION DATA MANAGEMENT

BACKGROUND

Computing systems can utilize communication networks to exchange data. In some implementations, a computing system can receive and process data provided by another computing system. For example, a computing system receive data entered using another computing system, store the data, process the data, and so on.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

The present disclosure relates to managing provision of—and access to—data sets among instances of function code executing in an on-demand manner.

Some data centers may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In addition to computational resources, data centers provide a number of other beneficial services to client devices. For example, data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length.

Some data centers include an on-demand code execution system, sometimes referred to as a serverless function execution system. Generally described, on-demand code execution systems enable execution of arbitrary user-designated function code, without requiring the user to create, maintain, or configure an execution environment (e.g., a physical or virtual machine) in which the function code is executed. For example, whereas conventional computing services often require a user to provision a specific device (virtual or physical), install an operating system on the device, configure application settings, define network interfaces, and so on, an on-demand code execution system may enable a user to submit code and may provide to the user an application programming interface (API) that, when used, enables the user to request execution of the function code. Upon receiving a call through the API, the on-demand code execution system may dynamically generate an execution environment for the code, provision the environment with the code, execute the code, and provide a result. Thus, an on-demand code execution system can remove a need for a user to handle configuration and management of environments for code execution. Due to the flexibility of on-demand code execution system to execute arbitrary function code, such a system can be used to create a variety of network services. For example, such a system could be used to create a "micro-service," a network service that implements a small number of functions (or only one function), and that interacts with other services to provide an application. In the context of on-demand code execution systems, the instance of function code executing to provide such a service is often referred to as an "invoked function," or simply as a "function" for brevity.

The infrastructure or configuration of an on-demand code execution system may place certain limitations on data access and sharing. In some cases, these limitations can interfere with or prevent use of the on-demand code execution system to execute individual functions that collectively provide an application or otherwise interact with and share data sets. For example, it may be desirable to access large data sets to perform certain functions. However, because each function loads the data set to work with it, and then the execution environment of each function is cleared after execution of each function has completed, any subsequent function working with the same data set must similarly load the data set first. This can be disadvantageous in the case of large data sets due to the cumulative effect on the network bandwidth and function execution time required to repeatedly load large data sets. Application developers using on-demand functions to build applications that need to process large amounts of data or share state across function instances can in some cases work around the loading and clearing of function data. However, to do so the application developers are required to do the complex design and implementation work to bring state into on-demand execution of functions and to synchronize that state across multiple functions. Moreover, in some data center environments it may not be permissible or possible to transfer extremely large data sets (e.g., 10s or 100s of gigabytes) from remote storage for access by an instance of function code executing on dynamically-provisioned hardware of an on-demand code execution system. Additionally, because function code is loaded onto and executed by a host computing system that is dynamically selected and provisioned at the time execution of the function code is requested or scheduled, it is difficult or impossible to store a data set locally on the host computing device and ensure that all functions requiring access to the data set will be similarly executed by the same host computing device or even on a host computing device that is nearby (in either a physical or logical networking sense).

Some aspects of the present disclosure address some or all of the issues noted above, among others, through an improved on-demand code execution system that automatically manages data movement and access across multiple instances of function code. In some embodiments, an API can be provided by which functions can store data sets to be shared with other functions, and by which functions can access data sets shared by other functions. The API shields developers from the work of moving, storing, and controlling access to the data sets. Moreover, the operation of the on-demand code execution system in response to API calls can provide features that would be difficult or impossible to implement in functions. For example, a function may initiate retrieval of a large data set from a network-based data storage system, and may store the large data set within the execution environment of the function such that it is accessible to the function. The function may then make a API call to obtain a reference to the data set. The on-demand code execution system can generate a data reference (e.g., a name, address, or pointer to the location of the data set) that can be passed to or discovered by other functions and can allow the other functions to access the data set even after the function that originally obtained the data set has finished execution. To facilitate sharing of the data set, the on-demand code execution system can cache a copy of the data set at a network-accessible location. When another function requests access to the data set using the data reference, the on-demand code execution system can copy the data set (or a portion thereof) to the local execution environment accessible to the function.

Additional aspects of the present disclosure relate to use of the APIs provided by the on-demand code execution system to produce multi-function applications that scale up as needed and scale down when processing is complete or otherwise no longer needed. In some embodiments, a function or subset of functions may be configured as "priming" functions. These functions may be executed to load large data sets for access by any number of subsequently-executed functions. For example, an application of on-demand functions may be primed with data that is to be used in evaluating, processing, and/or responding to events. Once the data sets have been loaded and sharable references have been generated, event processing functions may be executed as needed and can access the large data sets (or portions thereof) without being required to first load them. This can save time and computing resources. Moreover, the event processing functions may alter data in the data sets, store altered data sets, and share the altered data sets with other functions in a similar manner. In this way, there may be a degree of state sharing across functions.

Various aspects of the disclosure will be described with regard to certain examples and embodiments, which are intended to illustrate but not limit the disclosure. Although aspects of some embodiments described in the disclosure will focus, for the purpose of illustration, on particular examples of function code, data sets, and on-demand code execution system configurations, the examples are illustrative only and are not intended to be limiting. In some embodiments, the techniques described herein may be applied to additional or alternative types of function code (e.g., subroutines), data sets, and on-demand code execution system configurations. Additionally, any feature used in any embodiment described herein may be used in any combination with any other feature or in any other embodiment, without limitation.

Example Network Environment

An on-demand code execution system may provide a network-accessible service enabling users to submit or designate computer-executable source code—also referred to herein as "function code," or simply as "code" for brevity—to be executed by virtual machine instances on the on-demand code execution system. Each set of function code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). In some cases, the on-demand code execution system may enable users to directly trigger execution of a task based on a variety of potential events, such as transmission of an API or specially formatted hypertext transport protocol ("HTTP") packet to the on-demand code execution system. The on demand code execution system can therefore execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a request to execute a task is received. Due to the pre initialized nature of these virtual machines, delay (sometimes referred to as latency) associated with executing the task code (e.g., instance and language runtime startup time) can be significantly reduced, often to sub 100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute program code (a "task"), the on-demand code execution system may select a virtual machine instance for executing the program code of the user based on the one or more computing constraints related to the task (e.g., a required operating system or runtime) and cause the task to be executed on the selected virtual machine instance. The tasks can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware passthrough techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

Figure 1:
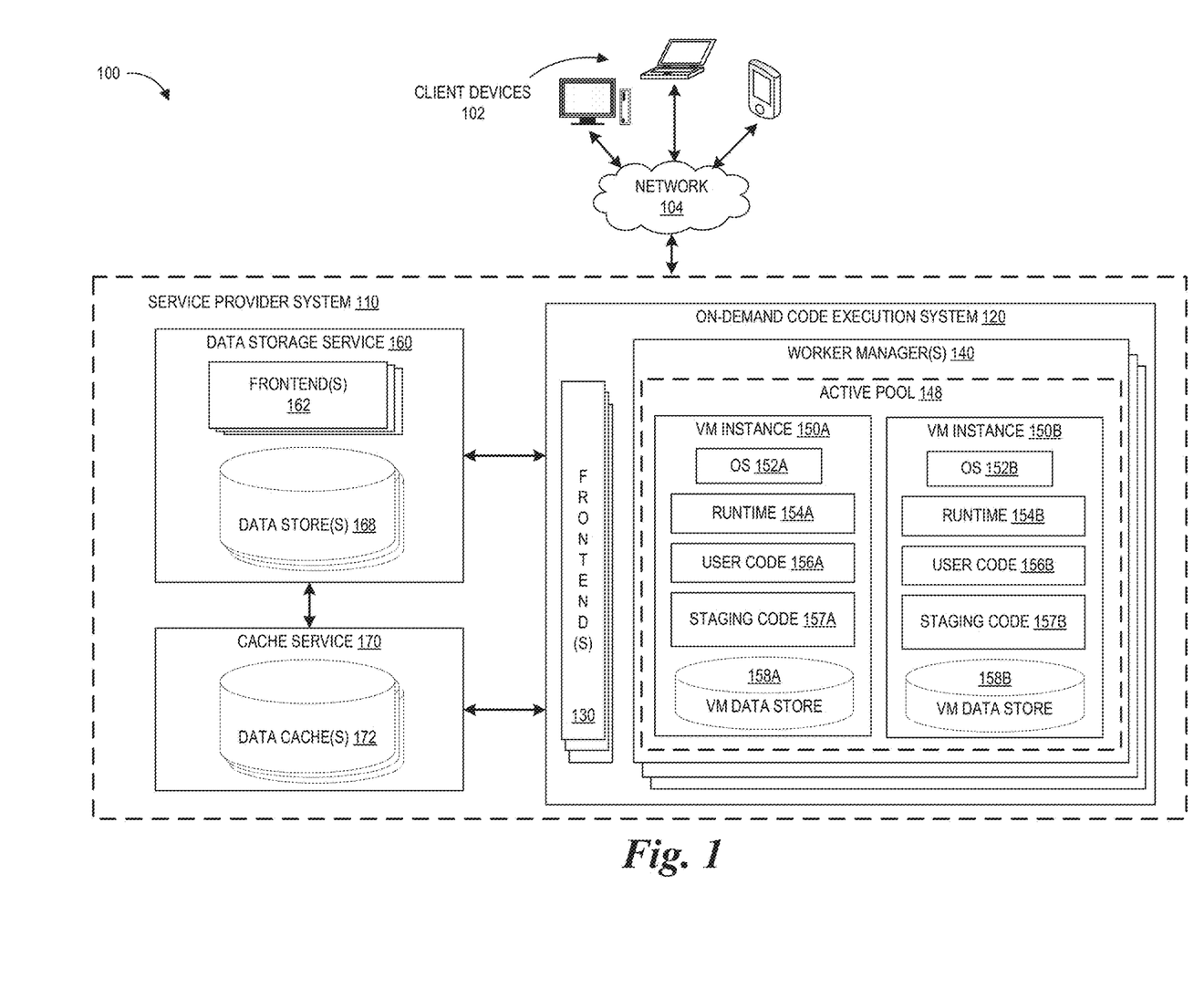
FIG. 1 is a block diagram of an illustrative computing environment in which environment in which an on-demand code execution system can operation in conjunction with a data storage system according to some embodiments.

FIG. 1 is a block diagram of an illustrative operating environment 100 in which a service provider system 110 operates to enable client devices 102 to submit or request invocation of user-defined code by an on-demand code execution system 120.

By way of illustration, various example client devices 102 are shown in communication with the service provider system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, the data storage service 160 can operate to enable clients to read, write, modify, and delete data, such as files, objects, blocks, or records, each of which represents a set of data associated with an identifier (an "object identifier" or "resource identifier") that can be interacted with as an individual resource. For example, an object may represent a single file submitted by a client device 102 (though the data storage service 160 may or may not store such an object as a single file). This object-level interaction can be contrasted with other types of storage services, such as block-based storage in which data is manipulated at the level of individual blocks or database storage in which data manipulation may occur at the level of tables or the like.

The data storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160. For example, a client device 102 may interact with a frontend 162 to create a collection of data objects on the service 160 (e.g., a "bucket" of objects) and to configure permissions for that collection. Client devices 102 may thereafter create, read, update, or delete objects within the collection based on the interfaces of the frontends 162. In one embodiment, the frontend 162 provides a REST-compliant HTTP interface supporting a variety of request methods, each of which corresponds to a requested I/O operation on the service 160. By way of non-limiting example, request methods may include:
  a GET operation requesting retrieval of an object stored on the service 160 by reference to an identifier of the object;
  a PUT operation requesting storage of an object to be stored on the service 160, including an identifier of the object and input data to be stored as the object;
  a DELETE operation requesting deletion of an object stored on the service 160 by reference to an identifier of the object; and
  a LIST operation requesting listing of objects within an object collection stored on the service 160 by reference to an identifier of the collection.

A variety of other operations may also be supported.

During general operation, frontends 162 may be configured to obtain a call to a request method, and apply that request method to input data for the method. For example, a frontend 162 can respond to a request to PUT input data into the service 160 as an object by storing that input data as the object on the service 160.

Data may be stored, for example, on data stores 168, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to access a data set or portion thereof from the service 160 by retrieving the requested data from the stores 168 (e.g., an object representing input data to a GET resource request), and returning the object to a requesting client device 102.

In some cases, calls to a request method may invoke one or more native data manipulations provided by the service 160. For example, a SELECT operation may provide an SQL-formatted query to be applied to an object (also identified within the request), or a GET operation may provide a specific range of bytes of an object to be returned.

The service provider system 110 illustratively includes a cache service 170 configured to cache data sets for code executed by the on-demand code execution system 120. Data may be cached, for example, on data caches 172, which correspond to any data storage such hard disk drives (HDDs), solid state drives (SSDs), network accessible storage (NAS), storage area networks (SANs), non-volatile random access memory (NVRAM), random access memory (RAM), or any of a variety of storage devices known in the art. Although illustrated as separate and outside of the data storage service and the on-demand code execution system 120, in some embodiments the cache service 170 may be implemented within one or both of the data storage service 160 or on-demand code execution system 120 (e.g., on physical or logical commuting systems that are part of the data storage service 160 or on-demand code execution system 120).

The client devices 102, data storage service 160, and on-demand code execution system 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The system 120 includes one or more frontends 130 which enable interaction with the on-demand code execution system 120. In an illustrative embodiment, the frontends 130 serve as a "front door" to the other services provided by the on-demand code execution system 120, enabling users (via client devices 102) to provide, request execution of, and view results of computer executable code. The frontends 130 include a variety of components to enable interaction between the on-demand code execution system 120 and other computing devices. For example, each frontend 130 may include a request interface providing client devices 102 with the ability to upload or otherwise communicate user-specified code to the on-demand code execution system 120 and to thereafter request execution of that code. In one embodiment, the request interface communicates with external computing devices (e.g., client devices 102, frontend 162, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," "function code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the service provider system 110 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the client devices 102 or the data storage service 160.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance).

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Once a triggering event to execute a task has been successfully processed by a frontend 130, the frontend 130 passes a request to a worker manager 140 to execute the task.

In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the data storage service 160 or cache service 170 and place that data into the VM data store 158. The staging code 157 can further be configured to obtain data written to a file within the VM data store 158, and to transmit that data to the data storage service 160 or cache service 170. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in user-space (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the data storage service 160 may be configured to provide file-level access to objects stored on the data stores 168, thus enabling the VM data store 158 to be virtualized based on communications between the staging code 157 and the service 160. For example, the data storage service 160 can include a file-level interface providing network access to objects within the data stores 168 as files. The file-level interface may, for example, represent a network-based file system server (e.g., a network file system (NFS)) providing access to objects as files, and the staging code 157 may implement a client of that server, thus providing file-level access to objects of the service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the service 160 (e.g., data objects or portions thereof, input data passed by client devices 102, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read-from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to an virtualized hardware output device, and read data written to that stream as output data. Thus, the examples provided herein with respect to file streams may generally be modified to relate to any IO stream.

The data storage service 160, cache service 170, and on-demand code execution system 120 are depicted in FIG. 1 as operating in a distributed computing environment including several computer systems that are interconnected using one or more computer networks (not shown in FIG. 1). The data storage service 160, cache service 170, and on-demand code execution system 120 could also operate within a computing environment having a fewer or greater number of devices than are illustrated in FIG. 1. Thus, the depiction of the data storage service 160, cache service 170, and on-demand code execution system 120 in FIG. 1 should be taken as illustrative and not limiting to the present disclosure. For example, the on-demand code execution system 120 or various constituents thereof could implement various Web services components, hosted or "cloud" computing environments, or peer to peer network configurations to implement at least a portion of the processes described herein. In some instances, the data storage service 160, cache service 170, and on-demand code execution system 120 may be combined into a single service. Further, the data storage service 160, cache service 170, and on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the data storage service 160, cache service 170, and on-demand code execution system 120 are illustrated as connected to the network 104. In some embodiments, any of the components within the data storage service 160, cache service 170, and on-demand code execution system 120 can communicate with other components of the on-demand code execution system 120 via the network 104. In other embodiments, not all components of the data storage service 160, cache service 170, and on-demand code execution system 120 are capable of communicating with other components of the virtual environment 100. In one example, only the frontends 130 and 162 (which may in some instances represent multiple frontends) of the on-demand code execution system 120 and the data storage service 160, respectively, may be connected to the network 104, and other components of the data storage service 160 and on-demand code execution system 120 may communicate with other components of the environment 100 via the respective frontends 130 and 162.

While some functionalities are generally described herein with reference to an individual component of the data storage service 160, cache service 170, and on-demand code execution system 120, other components or a combination of components may additionally or alternatively implement such functionalities. Thus, the specific configuration of elements within FIG. 1 is intended to be illustrative.

Figure 2:
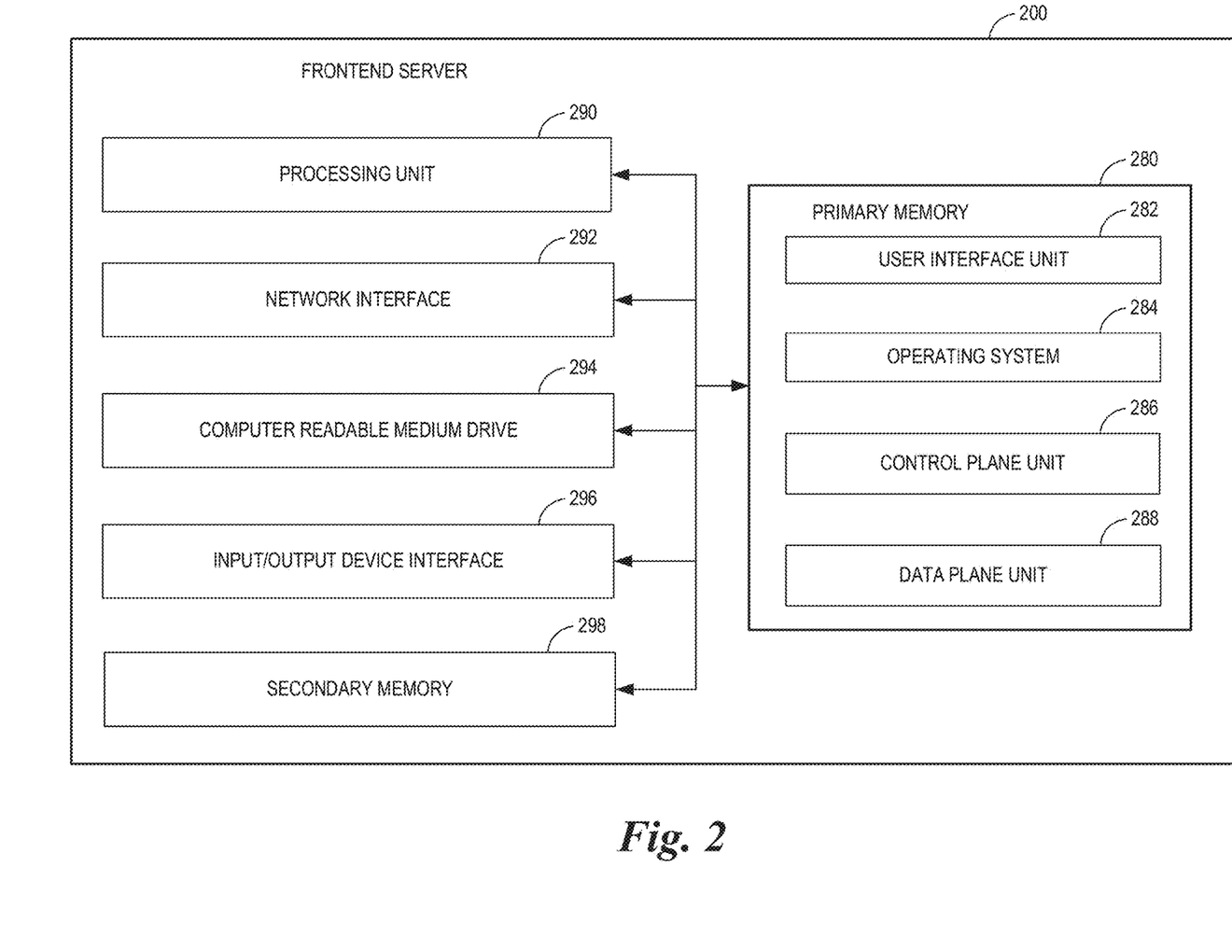
FIG. 2 is a block diagram of an illustrative computing system configured to provide data management across function invocations in the on-demand code execution system according to some embodiments.

FIG. 2 depicts a general architecture of a frontend server 200 computing device implementing a frontend 162 of FIG. 1. The general architecture of the frontend server 200 depicted in FIG. 2 includes an arrangement of computer hardware and software that may be used to implement aspects of the present disclosure. The hardware may be implemented on physical electronic devices, as discussed in greater detail below. The frontend server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the frontend server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 or secondary memory 298 and further provide output information for an optional display (not shown) via the input/output device interface 296. The input/output device interface 296 may also accept input from an optional input device (not shown).

The primary memory 280 or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the frontend server 200. The memory 280 may further include computer program instructions and other information for implementing aspects of the present disclosure. For example, in one embodiment, the memory 280 includes a user interface unit 282 that generates user interfaces (or instructions therefor) for display upon a computing device, e.g., via a navigation or browsing interface such as a browser or application installed on the computing device.

The memory 280 may include a control plane unit 286 and data plane unit 288 each executable to implement aspects of the present disclosure. Illustratively, the control plane unit 286 may include code executable to enable definition or submission of function code to be executed. The data plane unit 288 may illustratively include code enabling handling of I/O operations on the data storage service 160 or cache service 170, including retrieving data sets, generating data references to be used by other functions to access the data sets, caching the data sets, etc.

The frontend server 200 of FIG. 2 is one illustrative configuration of such a device, of which others are possible. For example, while shown as a single device, a frontend server 200 may in some embodiments be implemented as multiple physical host devices. Illustratively, a first device of such a frontend server 200 may implement the control plane unit 286, while a second device may implement the data plane unit 288.

While described in FIG. 2 as a frontend server 200, similar components may be utilized in some embodiments to implement other devices shown in the environment 100 of FIG. 1. For example, a similar device may implement a worker manager 140, as described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Example Cross-Function Data Management

Figure 3:
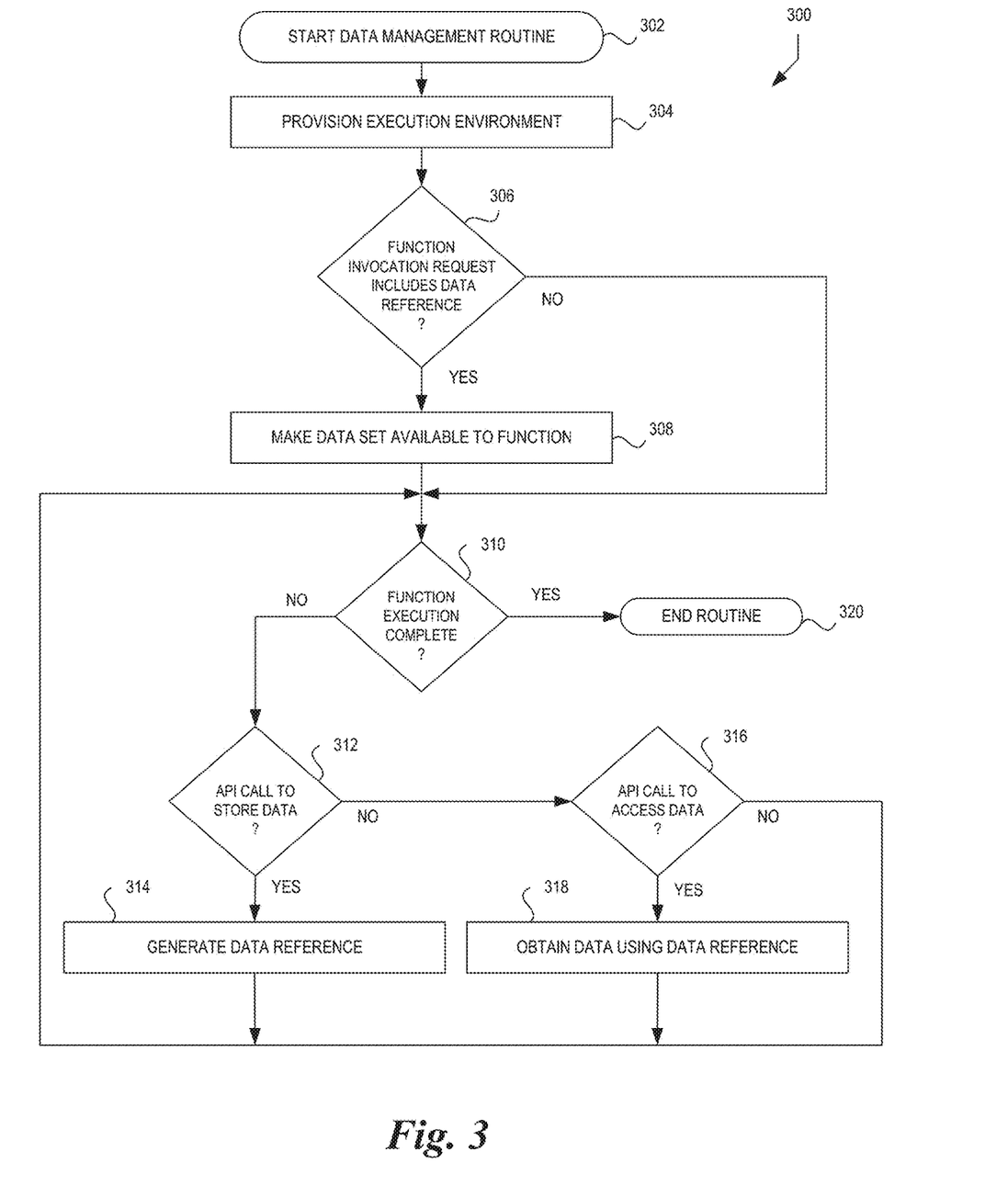
FIG. 3 is a flow diagram of an illustrative routine for managing data access across function invocations in the on-demand code execution system according to some embodiments.

FIG. 3 illustrates example routine 300 for cross-function data management. Advantageously, a component or subsystem of the on-demand code execution system 120, such as a frontend 130, worker manager 140, some other component, or a combination thereof may execute the routine 300 to share data across on-demand function invocations and enable low-latency, data-intensive workloads. For example, users can prime functions with references to shared data sets, facilitating separation of data ingestion code from business code. An API for data abstraction allows for linking functions together and passing references to previously-obtained or generated data as part of function invocation. Moreover, applications can scale out by downloading data to local cache and then have other function instances get data from the local cache or the cache service 170. This "stateful serverless" approach allows users to build and support complex workflows, sharing inter-invoke content for performance reasons, without need for roundtrip to the database for compute-heavy processing.

The routine 300 begins at block 302. The routine may begin in response to an event, such as receipt by the on-demand code execution system 120 of a request to invoke a function defined by function code. For example, a frontend 130 may receive an invocation request from a client device 102, a VM instance, a previously-invoked function executing within the on-demand code execution system 120, etc. In the description that follows, in order to distinguish the function currently being invoked from other functions (e.g., previously-invoked functions, subsequently-invoked functions, concurrently-invoked functions running in a parallel instance of routine 300, etc.), the function currently being invoked will be referred to as the "current function."

At block 304, the on-demand code execution system 120 can provision an execution environment for the function to be executed. In some embodiments, as described in greater detail above, a worker manager 140 may identify a VM instance on which the function is to be executed. Staging code within the VM instance may stage the execution environment for the function, and the function code may ultimately be loaded and may begin execution.

At decision block 306, the on-demand code execution system 120 can determine whether the request to invoke the function includes a data reference to a data set previously obtained or generated by a different function executed by the on-demand code execution system 120. In some embodiments, a data reference may be or include a name, address, or pointer to a location at which a previously-obtained or generated data is stored. When an invocation request is made for a particular function, the invocation request may include a data reference that the function can use to access the data set. For example, a function invocation request may include the data reference as a parameter. If the invocation request includes a data reference, the routine 300 may proceed to block 308. Otherwise, the routine may proceed to block 310.

At block 308, the on-demand code execution system 120 can make available to the current function the data set referenced by the data reference. To make the data set available to the current function, the on-demand code execution system 120 or a component thereof, such as a worker manager 140, an executing instance of staging code 157, etc., can determine whether the data set referenced by the data reference is available within the execution environment of the current function. For example, the data may be available within an input directory assigned to the current function, which corresponds to a VM data store 158 used by the VM instance 150 within which the current function will execute or is executing. If the data is not available (e.g., is not current stored within the input directory within the VM data store that is local to the VM instance within which the current function will execute), the data set may be retrieved from a network-accessible data cache 172 using the data reference and copied into the VM data store.

At decision block 310, the on-demand code execution system 120 can determine whether execution of the current function has completed. The current function may perform operations, access data, generate data, and so on. If the function is continuing to execute, the routine may proceed to blocks 312 or 316 to process API requests, if any, to access or store data. Once the function has completed execution, the routine 300 may end at block 320.

At decision block 312, the on-demand code execution system 120 can determine whether an API call has been made to store data obtained or generated during execution of the current function, such data to be made available to other functions executed by the on-demand code execution system 120. If so, the routine 300 can proceed to block 314. Otherwise, if there is no such pending API call, the routine 300 may proceed to decision block 316.

At block 314, the on-demand code execution system 120 can store a data set such that it is available to other functions executed by the on-demand code execution system 120. A function may be programmed to obtain a data set during execution. For example, the function may obtain a data set from the data storage service 160. The data set may be a set of one or more objects, files, blocks, records, or the like. The function may or may not perform processing on the data set before storage.

In some embodiments, if a data set is to be made available to other functions, the function may request to store the data set and generate a data reference. The request may be an API request handled by a component of the on-demand code execution system 120, such as a frontend 130, worker manager 140, etc. Table 1 below illustrates an example definition of an API call to generate a data reference to a data set that may be shared with other functions.

TABLE 1

Example Data Reference Creation API create_data_ref(
    data_path:file_path:string = /data/output,
    namespace_scope:string = account-id)
return data_ref:string In the example Data Reference Creation API, the parameter "data path" is used to provide the locally-accessible directory into which the function has stored the data set to be shared. The component of the on-demand code execution system 120 executing the current function can copy the data set from the locally-accessible directory into a network-accessible location, such as cache service 170, from where it can be shared with other functions. The on-demand code execution system 120 can generate a data reference that is uniquely associated with data set. For example, the data reference may be an alphabetic or alpha-numeric string that uniquely identifies the data set.

In some embodiments, the parameter "namespace_scope" is used to specify a namespace corresponding to a scope of accessibility of the data set. For example, if the namespace is set to a particular domain, then the account under which another function is executing can be evaluated to determine whether the account is within the domain authorized to access the data set. If authorized, the data set may be provided to the locally-accessible data store of the other function as described in greater detail below. Otherwise, if not authorized, an error or exception may be returned. In some embodiments, "namespace_scope" may be optional and may default to the account under which the current function is executing (e.g., all other functions attempting to access the data set must be executing under the same account as the current function).

At decision block 316, the on-demand code execution system 120 can determine whether an API call has been made during execution of the current function to access data associated with a data reference. If so, the routine 300 can proceed to block 318. Otherwise, if there is no pending API call to access data associated with a data reference, the routine may return to decision block 310.

At block 318, the on-demand code execution system 120 can obtain data using a data reference. A function may be programmed to obtain data using a data reference at various points after the function has begun execution. For example, the function may include a coded data reference in the function code, or the function may obtain or determine, dynamically during execution, the data reference for data to be accessed. The data reference may reference a data set that was previously generated or accessed by another function, such as a previously-executed or concurrently-executing function.

In some embodiments, if a data set is to be obtained using a data reference, the current function may access it through an API request that may be handled by a component of the on-demand code execution system 120, such as a frontend 130, worker manager 140, etc. Table 2 below illustrates an example definition of an API call to access data using a data reference.

TABLE 2

Example Fetch API fetch_data(
    data_ref:string = test-data-ref-id,
    target_dir_name = test-dir)
return /data/input/test-dir In the example Fetch API, the parameter "data_ref" is used to provide the data reference of the data set being requested. In some embodiments, the parameter "target_dir_name" is used to specify the name of the target directory into which the requested data is to be placed for access by the function. "target_dir_name" may be optional and may default to the default input directory for the function (e.g., a local storage directory of the VM instance in which the function is executing).

The on-demand code execution system 120 can use the passed data reference to obtain the requested data set for the function. For example, the cache service 170 may maintain cached versions of data sets designated by functions executed by the on-demand code execution system 120 for access by other functions executed by the on-demand code execution system 120, as described above. The data set may be obtained from the cache service 170 and placed into a data store that is locally-accessible to the function, such as a VM data store 158.

In some embodiments, if the data reference was generated with a namespace parameter being set, then the component of the on-demand code execution system 120 handling the API request can evaluate request to determine whether the request is associated with the specified namespace. For example, if the namespace is set to a particular account, then the account under which the current function is executing can be evaluated to determine whether the account is within the namespace authorized to access the data set. If authorized, the data set may be provided to the locally-accessible data store of the current function. Otherwise, if not authorized, an error or exception may be returned.

In some embodiments, a function can discover data references that are available for use to access data sets. For example, rather than (or in addition to) receiving data references as parameters at invocation, the function may make an API request to the on-demand code execution system 120 to provide the data references to the data sets that the function is permitted to access. Table 3 below illustrates an example definition of an API call to discover data references.

TABLE 3

Example Discover API discover_data_refs(
 namespace_scope:string = account-id)
retrum map{test-data-ref-id = test-ref-metadata}

In the example Discover API, the parameter "namespace_scope" is used to provide the namespace, or scope of accessibility, for which data references are being requested. The component of the on-demand code execution system 120 handling the API request can evaluate the namespace_scope and obtain a listing of all in-scope data references. For example, the on-demand code execution system 120 may maintain a listing of data references that have been generated and are still valid, and their corresponding namespaces. The on-demand code execution system 120 may return, to the current function in response to the API request, a listing of all in-scope data references. In some embodiments, the in-scope data referenced may be mapped to additional metadata regarding the data references that is also returned, such as the names of files or objects in the data set. The current function may use the output of the Discover API to access data sets, as described above.

Example Embodiments

Figure 4:
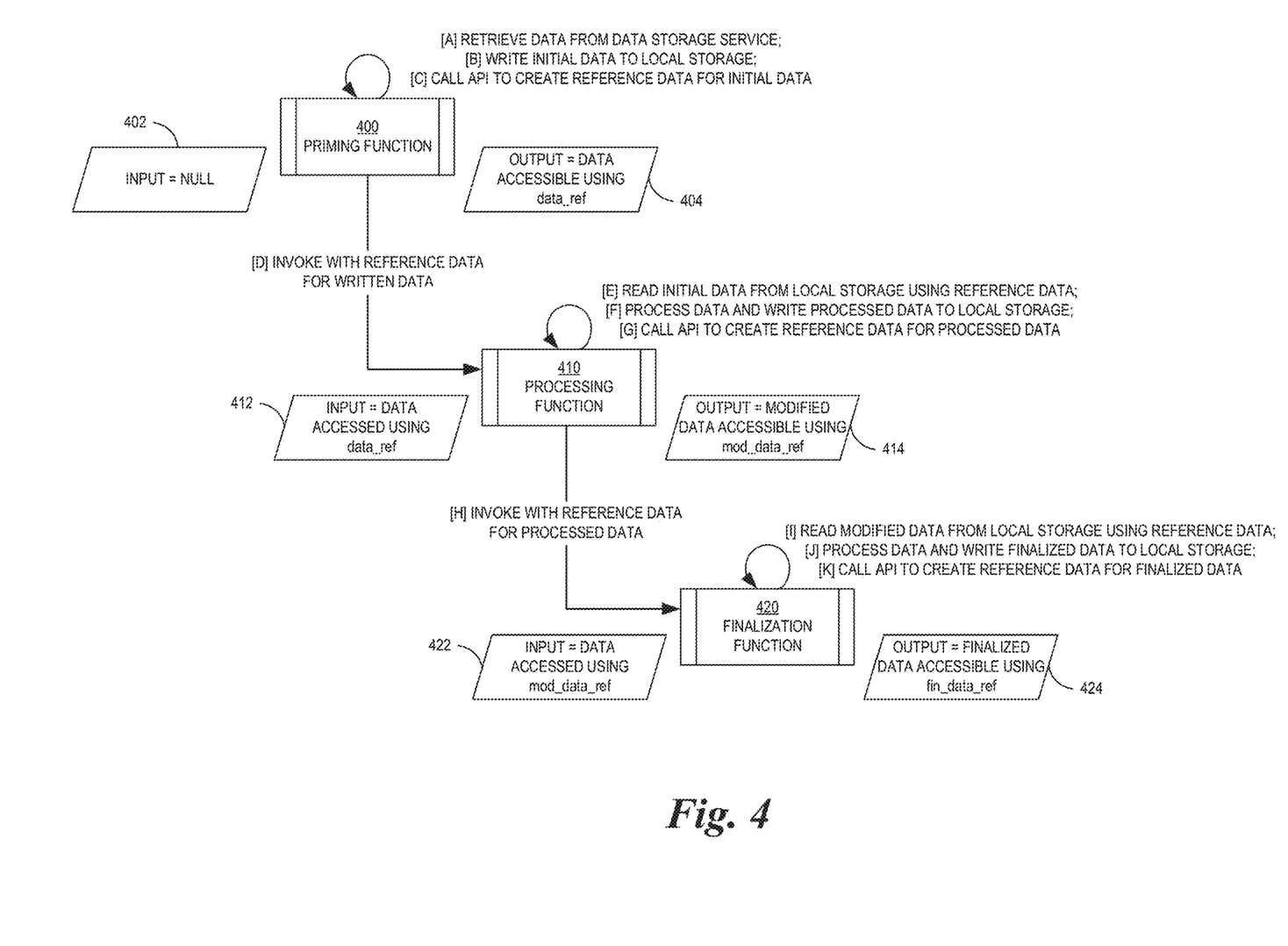
FIG. 4 is a block diagram of illustrative data flows and interactions during sequential invocation of on-demand code with passing of data between functions according to some embodiments.

FIG. 4 illustrates an example implementation in which on-demand functions are invoked and executed in a sequence, and each function operates on data generated by a previously-invoked function. This implementation may be used in a variety of applications, such as image processing, execution of MapReduce operations, and the like.

In some embodiments, a first function may serve as a priming function 400 that obtains data and makes the data available to subsequently-invoked functions, such as processing function 410 and finalization function 420. This operation of the priming function 400 as separate from subsequently-invoked functions can be important in cases where the initial data set to be operated upon is large or may otherwise take a significant amount of time to load. The solution can be particularly advantageous in cases where use of resources is monitored and users are charged based on execution time, or where each function is permitted to execute for only a limited time. By having a function serve as a priming function 400, invocation of any subsequent functions that will operate on the data set obtained by the priming function 400 can be delayed until the data set is available.

As shown, the priming function may be associated with an input data store 402 and an output data store 404. Each of the input data store 402 and output data store 404 can be implemented using the same physical or logical data store (e.g., VM data store 158), or they may be implemented using separate physical or logical data stores. In some embodiments, the input data store 402 may be a directory that is mapped to a virtualized data store, and the output data store 404 may be the same or a different directory that is mapped to the same or a different virtualized data store.

At [A], the priming function can retrieve an initial data set from data storage service 160. For example, the initial data set may be an image to be processed (e.g., converted, enhanced, analyzed), a set of images, a video, a MapReduce data set, etc.

At [B], the priming function 400 can write the initial data set to local storage. For example, the priming function 400 may write the data set as obtained or substantially as obtained (e.g., with little to no processing) to the output data store 404.

At [C], the priming function 400 can obtain a data reference for the initial data set. For example, the priming function 400 may make an API call, such as a call to the Data Reference Creation API described above, to obtain a data reference to the initial data set. In response, the on-demand code execution system 120 can generate and return the data reference, and copy the initial data set to a location (e.g., cache service 170) where it can be accessed by subsequently-invoked functions.

At [D], the priming function 400 or some other source can invoke a subsequent function, such as processing function 410. The invocation request for processing function 410 may include the data reference generated for the data set obtained by the priming function 400.

At [E], the processing function 410 can read the initial data set from local input data store 412. Illustratively, invocation of the processing function 410 using the data reference may have caused the on-demand code execution system 120 to load the data set (e.g., from cache service 170) into the input data store 412 for the processing function 410. Such loading, when performed as part of staging the execution environment for the processing function 410 and when performed to load a data set previously retrieved by another function and specifically stored for sharing with other functions, can reduce the time and computing resources required for the processing function 410 to be ready for performance of its substantive processing operations.

At [F], the processing function 410 may perform processing operations using the data set originally retrieved by the priming function 400. During the course of performing processing operations, the processing function 410 may modify the initial data set or generate additional data. In some embodiments, the data set originally obtained or generated by one function is immutable; it is not able to be modified by another function in local storage, or modifications to the data set in local storage are not synchronized to the cache service 170 to be made available to other functions. Thus, to make available to subsequent functions the modifications produced by the processing function 410, a separate data set will be stored and shared. To do so, the processing function 410 may first store the processed data set in locally-accessible storage, such as output data store 414.

At [G], the processing function 410 can obtain a data reference for the processed data set. For example, the processing function 410 may make an API call, such as a call to the Data Reference Creation API described above, to obtain a data reference to the processed data set. In response, the on-demand code execution system 120 can generate and return the data reference, and copy the processed data set to a location (e.g., cache service 170) where it can be accessed by subsequently-invoked functions.

At [H], the processing function 410 or some other source can invoke a subsequent function, such as finalization function 420. The invocation request for finalization function 420 may include the data reference generated for the data set obtained by the processing function 410.

At [I], the finalization function 420 can read the processed data set from local input data store 422. Illustratively, invocation of the finalization function 420 using the data reference may have caused the on-demand code execution system 120 to load the data set (e.g., from cache service 170) into the input data store 422 for the finalization function 420. Such loading, when performed as part of staging the execution environment for the finalization function 420 and when performed to load a data set previously retrieved or generated by another function and specifically stored for sharing with other functions, can reduce the time and computing resources required for the finalization function 420 to be ready for performance of its substantive processing operations.

At [J], the finalization function 420 may perform processing operations using the processed data set previously generated by the processing function 410. During the course of performing processing operations, the finalization function 420 may modify the processed data set or generate additional data. In some embodiments, to make available output produced by the finalization function 420, a separate data set will be stored and shared. To do so, the finalization function 420 may first store the finalized data set in locally-accessible storage, such as output data store 424.

At [K], the finalization function 420 can obtain a data reference for the finalized data set. For example, the finalization function 420 may make an API call, such as a call to the Data Reference Creation API described above, to obtain a data reference to the finalized data set. In response, the on-demand code execution system 120 can generate and return the data reference, and copy the finalized data set to a location (e.g., cache service 170) where it can be accessed by subsequently-invoked functions.

The example functions, data flows, and interactions shown in FIG. 4 and described herein are illustrative only, and are not intended to be limiting, required, or exhaustive. In some embodiments, additional, fewer, or alterative functions, data flows, or interactions may be implemented. For example there may be two or more processing functions between the priming functions and the finalization function.

Figure 5:
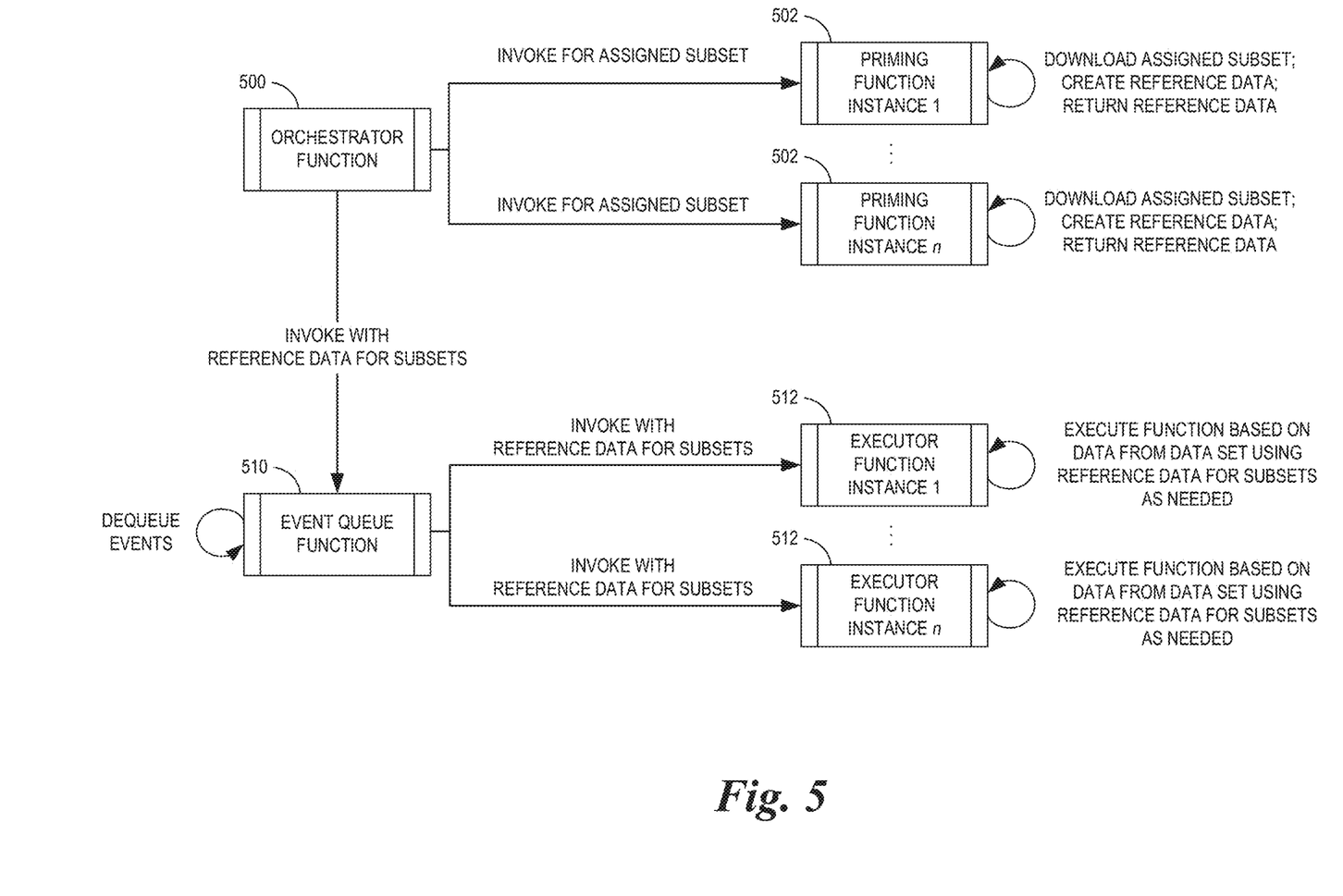
FIG. 5 is a block diagram of illustrative data flows and interactions during event-based invocation of on-demand code with sharing of data according to some embodiments.

FIG. 5 illustrates an example implementation in which on-demand functions are invoked and executed in response to events, and each function operates on data generated by a previously-invoked set of priming functions. This implementation may be used in applications such as data analytics and data processing in which large data sets are used to process events. In some cases, the data sets may be so large (e.g., many gigabytes, terabytes, or more) that computing resource constraints make obtaining the data sets in response to the events impractical or impossible. For example, there may be limitations on bandwidth usage or execution time that prevent obtaining some large data sets altogether. As another example, even if bandwidth and execution time are not systematically constrained, usage charges based on execution time can make obtaining the data sets in response to each event impractical. By having a function (or set of functions) serve as a priming function and leveraging the APIs for cross-function data sharing exposed by the on-demand code execution system 120, the priming function(s) can make a large data set available for use by any number of other functions.

In some embodiments, a set of priming functions are executed to collectively obtain the large data set as a collection of subsets, which are made available to subsequent executor functions for use in processing or responding to events. For example, to begin the priming process, an orchestrator function 500 may be invoked. The orchestrator function 500 may invoke a set of priming function instances 502. The priming function instances 502 may be invoked instances of the same function code, or they may be invoked instances of different function code. For example, the orchestrator function 500 may determine that n priming functions are to be executed to obtain a large data set as a collection of n smaller subsets. The orchestrator function 500 may invoke each of the n priming functions with a different parameter specifying—or from which the priming function instance can determine—the subset to be obtained.

The priming function instances 502 may download their respective subsets and create data references (e.g., by calling the Data Reference Creation API). In response, the on-demand code execution system 120 may copy the subsets from the local storage for each priming functions to the cache service 170, where the subsets will be available for use by subsequent functions. In some implementations the priming function instances 502 may also return the created data references to the orchestrator function 500.

Once the priming function instances 502 have obtained and made available their subsets, executor functions may use the subsets to respond to or otherwise processes events. In some embodiments, the orchestrator function 500 may invoke an event queue function 510 and pass it references to the subsets obtained by the priming function instances 502. The event queue function 510 may maintain or have access to an event queue in which various events are held for processing. For example, events may be transactions to be processed based on the large data set. The event queue function 510 may dequeue events from the event queue an invoke executor function instances 512. The executor function instances 512 may be invoked instances of the same function code, or they may be invoked instances of different function code. For example, the event queue function 510 may invoke an executor function instance 512 for each event dequeued from the event queue, such that n executor function instances 512 are invoked if there are n events in the queue. The event queue function 510 may invoke a given executor function instance 512 with a parameters identifying or detailing the event to be processed by the executor function instance 512. In some embodiments, if event data is too large to be passed as a parameter, the event queue function 510 may save the event data as a data set, obtain a data reference, and provide the data reference to the executor function instance 512.

The event queue function 510 may also provide data references for the subsets to be used by the executor function instances 512. In some embodiments, executor function instances 512 may determine data references without the data references being provided by the event queue function 510. For example, executor function instances 512 may use the Discover API to determine the data references for the subsets to be used by the executor function instances 512 in processing events.

Executor function instances 512 may use the data sets to process or respond to events, as needed, without first being required to obtain the large data sets.

The example functions, data flows, and interactions shown in FIG. 5 and described herein are illustrative only, and are not intended to be limiting, required, or exhaustive. In some embodiments, additional, fewer, or alterative functions, data flows, or interactions may be implemented.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a data storage service comprising a first set of computing devices, wherein the data storage service stores a plurality of data objects;
    a cache service comprising a second set of computing devices, wherein the cache service stores cached versions of data sets; and
    an on-demand code execution service comprising a third set of computing devices for on-demand execution of function code, wherein the on-demand code execution service is configured to at least:
        receive a first request to execute a priming function defined by priming function code;
        in response to the first request, provision a first computing device of the third set of computing devices with the priming function code;
        execute the priming function on the first computing device, wherein the priming function obtains a data set from the data storage service;
        receive, from the priming function, a second request to generate a data reference associated with the data set;
        generate the data reference;
        store a cached version of the data set at the cache service;
        subsequent to completion of execution of the priming function, receive a third request to execute an executor function defined by executor function code, wherein the third request is received in response occurrence of data processing event, and wherein the third request comprises the data reference;
        in response to the third request, provision a second computing device of the third set of computing devices with the executor function code;
        store a local copy of the cached version of the data set from the cache service to a local cache on the second computing device based on the data reference; and
        execute the executor function on the second computing device, wherein the executor function accesses the local copy of the cached version of the data set.

2. The system of claim 1, wherein the local copy of the cached version of the data set is immutable, and wherein the executor function stores, in a local output data store of the second computing device, a modified data set based on applying a modification to at least a portion of the local copy of the cached version of the data set.

3. The system of claim 2, wherein the on-demand code execution service is further configured to:
    receive, from the executor function, a fourth request to generate a second data reference associated with the modified data set;
    generate the second data reference; and
    store a cached version of the modified data set at the cache service.

4. The system of claim 1, wherein the on-demand code execution service is further configured to:
    determine that an account under which the executor function is to execute; and
    determine that the cached version of the data is in scope for the account.

5. A computer-implemented method comprising:
    under control of a computing system comprising one or more computer processors configured to execute specific instructions,
        configuring a code execution system to execute a first instance of first function code, wherein the code execution system provides on-demand execution of function code on dynamically-selected hardware;
        executing the first instance using the code execution system;
        determining that a data set used by the first instance is to be available to one or more other instances of function code executed by the code execution system;
        generating a data reference comprising a reference to be used to access the data set;
        receiving an invocation request to execute second function code;
        configuring the code execution system to execute a second instance of the second function code;
        executing the second instance using the code execution system;
        receiving, from the second instance, a data access request comprising the data reference; and
        providing, to the second instance, access to the data set based on the data reference.

6. The computer-implemented method of claim 5, wherein determining that the data set is to be available to the one or more other instances of function code executed by the code execution system comprises receiving, from the first instance, a request to generate the data reference, wherein the request comprises:

location data representing a location of the data set in a local storage location associated with the first instance; and namespace data representing a namespace to access the data set.

7. The computer-implemented method of claim 6, further comprising determining, based on the namespace data, to provide to the second instance access to the data set.

8. The computer-implemented method of claim 5, further comprising storing a cached version of the data set in a network-accessible cache in response to determining that the data set is to be available to the one or more other instances of function code executed by the code execution system.

9. The computer-implemented method of claim 8, wherein providing to the second instance access to the data set comprises replicating at least a portion of the cached version of the data set from the network-accessible cache to a local cache of a host computing device on which the second instance is executing.

10. The computer-implemented method of claim 5, further comprising:
   determining that a second data set used by the second instance is to be available to the one or more other instances of function code executed by the code execution system; and
   generating a second data reference comprising a reference to be used to access the second data set.

11. The computer-implemented method of claim 10, further comprising:
   receiving a third request to execute third function code;
   configuring the code execution system to execute a third instance of the third function code;
   executing the third instance using the code execution system;
   receiving, from the third instance, a discovery request; and
   determining that the third instance is permitted to access the second data set based on a namespace associated with the second data set.

12. The computer-implemented method of claim 11, further comprising:
   determining an account under which the third instance is to be executed; and
   determining, based on the namespace associated with the second data set, that the second data set is in scope for the account.

13. A system comprising computer readable memory and one or more processors, wherein the system is configured to:
   configure a code execution system to execute a first instance of first function code, wherein the code execution system provides on-demand execution of function code on dynamically-selected hardware;
   execute the first instance using the code execution system;
   determine that a data set used by the first instance is to be available to one or more other instances of function code executed by the code execution system;
   generate a data reference comprising a reference to be used to access the data set;
   receive an invocation request to execute second function code, wherein the invocation request comprises the data reference;
   configure the code execution system to execute a second instance of the second function code;
   execute the second instance using the code execution system; and
   provide, to the second instance, access to the data set based on the data reference.

14. The system of claim 13, wherein to determine that the data set is to be available to the one or more other instances of function code executed by the code execution system, the system is further configured to receive, from the first instance, a request to generate the data reference, wherein the request comprises:
   location data representing a location of the data set in a local storage location associated with the first instance; and
   namespace data representing a namespace to access the data set.

15. The system of claim 14, further configured to determine, based on the namespace data, to provide to the second instance access to the data set.

16. The system of claim 13, further configured to store a cached version of the data set in a network-accessible cache in response to determining that the data set is to be available to the one or more other instances of function code executed by the code execution system.

17. The system of claim 16, wherein to provide to the second instance access to the data set, the system is further configured to replicate at least a portion of the cached version of the data set from the network-accessible cache to a local cache of a host computing device on which the second instance is executing.

18. The system of claim 13, further configured to:
   determine that a second data set used by the second instance is to be available to the one or more other instances of function code executed by the code execution system; and
   generate a second data reference comprising a reference to be used to access the second data set.

19. The system of claim 18, further configured to:
   receive a third request to execute third function code;
   configure the code execution system to execute a third instance of the third function code;
   execute the third instance using the code execution system;
   receive, from the third instance, a discovery request; and
   determine that the third instance is permitted to access the second data set based on a namespace associated with the second data set.

20. The system of claim 19, further configured to:
   determining an account under which the third instance is to be executed; and
   determining, based on the namespace associated with the second data set, that the second data set is in scope for the account.

* * * * *